Patented Apr. 24, 1928.

1,667,323

UNITED STATES PATENT OFFICE.

ALFRED T. LARSON, OF WILMINGTON, DELAWARE, ASSIGNOR TO LAZOTE, INCORPORATED, OF WILMINGTON, DELAWARE, A CORPORATION OF DELAWARE.

AMMONIA SYNTHESIS PROCESS AND CATALYST.

No Drawing.   Application filed February 16, 1926.   Serial No. 88,687.

This invention relates to a catalytic process for the synthesis of ammonia, an iron catalyst containing a mixed "promoter" comprising an oxide of an alkali metal and an oxide of an alkaline earth metal as hereinafter defined, and a method of preparing the catalyst which comprises forming an intimate mixture of the oxides of the metals and treating the mixture with a hydrogen-containing gas.

It is well known that iron will accelerate the reaction whereby ammonia is formed directly from its elements. None of the known forms of pure iron are capable, however, of maintaining a high catalytic activity for any appreciable length of time.

It is also known that certain substances, admixed with the iron, greatly modify its catalytic power or effect. Some of these substances are known to greatly interfere with the catalytic properties of iron; in fact, some of them effectively destroy its catalytic properties. Such substances are usually referred to as "poisons" and may include such elements as sulfur, selenium, tellurium, phosphorus, arsenic, antimony, bismuth, lead, tin, and the halogens and compounds of these elements.

Furthermore, it is known that there are certain substances whose presence in the nitrogen-hydrogen mixture employed in the synthesis of ammonia will deleteriously affect the catalyst, but not permanently. That is to say, substantially the original activity of the catalyst will return if the gases containing poisoning ingredients are replaced by pure gases. Oxygen and certain of its compounds, such as carbon monoxide, carbon dioxide and water, are typical examples of this class of poisons. To distinguish these from the poisons which, like sulfur, permanently decrease the activity of the catalyst, the latter are referred to as permanent poisons.

Whereas certain substances destroy the catalytic properties of iron, other substances increase its catalytic activity and maintain it in an active condition for somewhat longer periods of time than when pure iron is used alone. Such substances have been designated as "promoters".

Various substances have been proposed from time to time as suitable "promoters" for iron catalysts. For example, it has been held that oxides of most of the metals would effectively "promote" iron catalysts. My experiments have shown, however, that very few of these materials when added singly to pure iron, lead to any practical advantage. Thus for example, an iron catalyst prepared by burning pure iron in oxygen, crushing and screening the product and then reducing it in a nitrogen-hydrogen mixture gives an average of 3.24% ammonia at 100 atmospheres pressure, 450° C. and a space velocity of 5000. This is typical of the results obtainable with iron catalysts containing no "promoters". Catalysts consisting solely of iron and an oxide of any one of the alkali metals, or solely of iron and an oxide of any one of the alkaline earth metals, have not been found to yield satisfactory results, particularly at high pressures and high temperatures. Thus, at 900 atmospheres pressure and 500° C. and with such hourly rates of gas flow as would be required in the practical production of ammonia, less than 6% of ammonia is produced. When catalysts are employed in the practical production of ammonia they are subjected to temperatures considerably in excess of 500° C. When such catalysts as I have just described, which by careful treatment can be made to give about 6% ammonia at 500° C. are subjected to temperatures as high as 750° C., they suffer an appreciable loss in activity, so that when the temperature is again returned to 500° C. less than 1% ammonia is produced.

Although alkali metal oxides and alkaline earth metal oxides when employed separately do not satisfactorily promote an iron catalyst, I have discovered that by suitably adding to the iron a mixed promoter comprising at least one oxide of an alkaline earth metal, and one oxide of an alkali metal, wholly unexpected and most excellent results are obtained in that catalysts of this type are not only more active for the synthesis of ammonia than iron alone but also more active than a catalyst consisting solely of iron and a single oxide of an alkali metal or an alkaline earth metal. Thus, I have found that an iron catalyst containing a mixed promoter comprising about 1% sodium oxide and 2% magnesium oxide will give 20–25% ammonia under normal synthesis conditions for relatively long periods of time. My experiments have likewise shown that mixed promoters comprising lithium oxide and magnesium oxide also produce excellent results when added to an iron catalyst. Mixed promoters comprising sodium oxide and calcium oxide, or potassium oxide and barium oxide can also be employed advantageously.

In describing the nature of my invention I have referred to the alkali metals, which classification of elements for the purpose of this invention is understood to include lithium, sodium, potassium, rubidium and cesium. Although magnesium oxide is not always included with the alkaline earth metals, nevertheless for the purpose of this invention, I have included it with calcium, barium, and strontium, and whenever reference is made herein to the alkaline earth metals, it should be understood that these four elements are included within the same group.

In preparing my new form of iron catalyst I have found that the mixed promoters above described may be used in varying proportions as regards both the ratio of the promoter constituents one to the other, and the ratio of total promoter content to the iron employed. Excellent results can be obtained with about 1% of alkali metal oxide and about 1% of the alkaline earth metal oxide.

The following specific examples are given to illustrate the preparation of my new form of promoted iron catalyst:

Example 1. Add approximately 1% of pure sodium oxide and 1% of pure magnesium oxide to pure ferroso-ferric oxide, the percentage being based on the total catalytic material calculated as oxides. Melt the oxide mixture, allow to cool, crush and screen to suitable size. Place the screened material in a suitable reaction tube and treat the oxide mixture at atmospheric pressure with pure hydrogen, free from such permanent catalyst poisons as sulphur, or with the nitrogen-hydrogen mixture employed in the synthesis. The reduction is started at about 400° C. The temperature is gradually increased until that temperature is reached at which it is proposed to conduct the synthesis reaction. When a nitrogen-hydrogen gas mixture under 900 atmospheres pressure, and free from catalytic poisons, such as sulphur and oxygen, is passed over this reduced material at 550–600° C., practical yields of ammonia are obtained. For most purposes, the temperature of reduction of the oxide mixture is preferably maintained between 300° and 600° C. Catalysts of this type may be used for the production of ammonia at temperatures within the range of 400° to 700° C.

Example 2. Prepare a solution containing approximately 100 parts of pure ferric nitrate and 2.5 parts of pure barium nitrate. To this solution add with constant stirring a dilute solution of pure potassium carbonate. When precipitation has been completed the iron-barium precipitate is washed by decantation, filtered, and then slowly dried in an oven maintained at a temperature of 100–125° C. The dried mass is then crushed and screened to the desired particle size. This material is charged into a reaction tube and reduced as described in Example 1. My experiments have indicated that in this method of preparation a sufficient amount of potassia ($K_2O$) is absorbed by the iron-barium precipitate, and is not removed by the washing process.

The material employed for my new form of iron catalyst may be either the oxides themselves, the metals or elements or compounds of these metals or elements which may be converted to suitable form for the catalyst. In the selection of such materials, it is important that they be free from catalyst poisons if the best results are to be obtained.

While my catalyst has been described as a mixture of iron, alkali metal oxide and alkaline earth metal oxide, it is possible that the catalyst when in use consists of the elements iron, the alkali metal and the alkaline earth metal, either with or without some modicum of oxides. I do not attempt to offer any theory for the formation or the final composition of the catalyst. I have observed that with a catalyst formed by the reduction of iron and alkali metal oxide, continued use of the catalyst seems to result in a gradual loss of the alkali metal, possibly due to a reduction of the alkali metal oxide and a gradual volatilization of the resultant alkali metal. It may be that one of the functions of the alkaline earth oxide contained in my catalyst is to prevent this loss of alkali metal. It may be that the process of making the catalyst results in the formation of a more or less complex compound of the elements or oxides or both, which on subsequent reduction forms other compounds or mixtures.

I claim:

1. A process for producing a catalyst for the synthesis of ammonia which comprises making an intimate mixture of iron oxide, an alkali metal oxide, and an alkaline earth metal oxide, forming the mixture into particles and treating the particles with a hydrogen-containing gas free from permanent catalyst poisons at a temperature of 300–700° C.

2. A process for producing a catalyst for the manufacture of ammonia from its elements which comprises melting together iron oxide, alkali metal oxide and alkaline earth metal oxide, cooling the melt, forming the cooled melt into particles and treating the particles with hydrogen-containing gas free from permanent catalyst poisons at a temperature of 300–700° C.

3. A process for producing a catalyst for the manufacture of ammonia from its elements, which comprises melting together iron oxide with about 1% of an alkali metal oxide and about 1% of an alkaline earth metal oxide, cooling the melt, forming the cooled melt into particles and treating the particles with hydrogen-containing gas free from permanent catalyst poisons at a temperature of 300–700° C.

4. A catalyst for the manufacture of ammonia, said catalyst being the reduction product of a mixture containing an iron compound, an alkali metal compound and an alkaline earth metal compound, said catalyst being more active in the synthesis of ammonia than iron alone.

5. A catalyst for the manufacture of ammonia from its elements containing iron, an alkali metal oxide and an alkaline earth metal oxide, said catalyst being more active in the synthesis of ammonia than iron alone.

6. A catalyst for the manufacture of ammonia from its elements comprising iron, an alkali metal oxide and an alkaline earth metal oxide and free from catalyst poisons, said catalyst being more active in the synthesis of ammonia than iron alone.

7. A catalyst for the manufacture of ammonia from its elements comprising iron with about 1% sodium oxide and about 1% magnesium oxide.

8. A catalyst for the manufacture of ammonia from its elements comprising the product of the fusion and reduction of a mixture of iron oxide, sodium oxide and magnesium oxide.

9. A catalyst for the manufacture of ammonia from its elements comprising the product of the fusion and reduction of a mixture of iron oxide with about 1% sodium oxide and about 1% magnesium oxide.

10. A catalyst for the manufacture of ammonia from its elements comprising the product of the fusion and reduction of a mixture of iron oxide, alkali metal oxide and alkaline earth metal oxide, said catalyst being more active in the synthesis of ammonia than iron alone.

11. A process for the synthesis of ammonia which comprises passing a mixture of nitrogen and hydrogen free from permanent catalyst poisons, over an iron-sodium oxide-magnesium oxide catalyst.

12. A process for the synthesis of ammonia which comprises passing a mixture of nitrogen and hydrogen over an iron-sodium oxide-magnesium oxide catalyst at a substantially constant temperature between about 400° and 700° C.

13. A process for the synthesis of ammonia which comprises passing a mixture of nitrogen and hydrogen, under 900 atmospheres pressure over an iron-sodium oxide-magnesium oxide catalyst.

14. A process for the synthesis of ammonia which comprises passing a mixture of nitrogen and hydrogen, under pressure over a catalyst containing iron, a sodium compound and a magnesium compound, and maintained at a temperature between about 400° and 700° C.

15. A process for the synthesis of ammonia which comprises passing a mixture of nitrogen and hydrogen over an iron-alkali metal oxide-alkaline earth metal oxide catalyst which is more active in the synthesis of ammonia than iron alone.

16. A process for the synthesis of ammonia which comprises passing a mixture of nitrogen and hydrogen over an iron-alkali metal oxide-alkaline earth metal oxide catalyst which is more active in the synthesis of ammonia than iron alone at a substantially constant temperature between about 400° and 700° C.

17. A process for the synthesis of ammonia which comprises passing a mixture of nitrogen and hydrogen, under 900 atmospheres pressure over an iron-alkali metal oxide-alkaline earth metal oxide catalyst which is more active in the synthesis of ammonia than iron alone.

18. A process for the synthesis of ammonia which comprises passing a mixture of nitrogen and hydrogen under pressure over a catalyst containing iron, an alkali-metal compound and an alkaline earth metal compound which is more active in the synthesis of ammonia than iron alone, and maintained at a temperature between about 400° and 700° C.

19. A process for the synthesis of ammonia, which comprises passing a mixture of nitrogen and hydrogen under pressure over an iron-alkali metal oxide alkaline earth metal oxide catalyst which is more active in the synthesis of ammonia than iron alone.

20. A process for the synthesis of ammonia, which comprises passing a mixture of nitrogen and hydrogen over a fused iron-alkali metal oxide-alkaline earth metal oxide catalyst which is more active in the synthesis of ammonia than iron alone.

21. A process for the synthesis of ammonia, which comprises passing a mixture of nitrogen and hydrogen under pressure over an iron-sodium oxide-magnesium oxide catalyst which is more active in the synthesis of ammonia than iron alone.

22. A process for the synthesis of ammonia, which comprises passing a mixture of nitrogen and hydrogen under pressure over a catalyst comprising the reduction product of a fused mixture of iron oxide, sodium oxide and magnesium oxide, said catalyst being more active in the synthesis of ammonia than iron alone.

23. A process for producing a catalyst for the synthesis of ammonia, which comprises making an intimate mixture of iron oxide, alkali metal oxide and magnesium oxide, forming the mixture into particles and treating the particles with a hydrogen-containing gas at a temperature of 300° to 700° C.

24. A catalyst for the manufacture of ammonia from its elements containing iron, an alkali metal compound and a magnesium compound, said catalyst being more active in the synthesis of ammonia than iron alone.

25. A catalyst for the manufacture of ammonia from its elements comprising iron with about one per cent alkali metal oxide and about one per cent magnesium oxide.

26. A catalyst for the manufacture of ammonia from its elements comprising iron with alkali metal oxide and about one per cent magnesium oxide.

27. A process for the synthesis of ammonia, which comprises passing a mixture of nitrogen and hydrogen over an iron-alkali metal oxide-magnesium oxide catalyst which is more active in the synthesis of ammonia than iron alone.

28. A process for the synthesis of ammonia, which comprises passing a mixture of nitrogen and hydrogen over a catalyst resulting from the reduction of a mixture containing iron, an alkali metal compound and a magnesium compound, said catalyst being more active in the synthesis of ammonia than iron alone.

29. A process for the synthesis of ammonia, which comprises passing a mixture of nitrogen and hydrogen over a catalyst resulting from the reduction of a mixture containing iron, an alkali metal compound and a magnesium compound, said catalyst being more active in the synthesis of ammonia than iron alone at a temperature between about 400° and 700° C.

In testimony whereof I affix my signature

ALFRED T. LARSON.